United States Patent [19]

Ogino et al.

[11] Patent Number: 5,354,512
[45] Date of Patent: Oct. 11, 1994

[54] DYE-CONTAINING POLARIZING FILM

[75] Inventors: Kazuya Ogino; Setsuko Aoki; Koji Higashi, all of Osaka, Japan

[73] Assignee: Sumitomo Chemical Company Limited, Osaka, Japan

[21] Appl. No.: 935,248

[22] Filed: Aug. 27, 1992

[30] Foreign Application Priority Data

Aug. 29, 1991 [JP] Japan ................................. 3-218530
Aug. 29, 1991 [JP] Japan ................................. 3-218540

[51] Int. Cl.$^5$ ............................................. F21V 9/14
[52] U.S. Cl. ................................... 252/585; 534/831; 534/832; 534/833
[58] Field of Search ............... 252/582, 585; 534/831, 534/832, 833; 359/490

[56] References Cited

U.S. PATENT DOCUMENTS

| | | | |
|---|---|---|---|
| 4,514,559 | 4/1985 | Sato et al. | 252/585 |
| 5,104,572 | 4/1992 | Ozawa et al. | 252/585 |

FOREIGN PATENT DOCUMENTS

| | | |
|---|---|---|
| 0342241 | 11/1989 | European Pat. Off. |
| 3236238 | 5/1984 | Fed. Rep. of Germany |
| 57-145155 | 9/1982 | Japan |
| 183602 | 7/1989 | Japan |
| 252904 | 10/1989 | Japan |
| 76572 | 3/1990 | Japan |
| 96102 | 4/1990 | Japan |

OTHER PUBLICATIONS

Derwent Abstract 86-342245.
Derwent Abstract 91-062788.
Derwent Abstract 91-153223.
Patent Abstracts of Japan, vol. 015, No. 230, JP-A-3068902, Jun. 12, 1991.

*Primary Examiner*—Philip Tucker
*Attorney, Agent, or Firm*—Cushman, Darby & Cushman

[57] ABSTRACT

A dye-containing polarizing film comprising a polarizing film material and a metal-containing dye represented by the following formula (I):

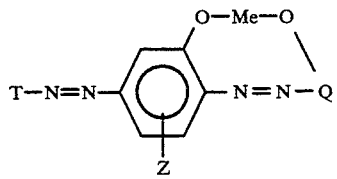

wherein
Me is a transition metal selected from copper, nickel, zinc and iron;
Z is hydrogen, lower alkyl, lower alkoxy, sulfo or amino which is unsubstituted or substituted;
Q is a 1-naphthol or 2-naphthol residue which is unsubstituted or substituted and has no or an additional phenylazo or naphthylazo group unsubstituted or substituted and in which a hydroxy group is adjacent to the azo group bonding to the benzene ring having Z and is linked with the transition metal denoted by Me to form the complex;
when Q is the naphthol residue having no additional azo group, then T is naphthyl which is unsubstituted or substituted; and
when Q is the naphthol residue having an additional azo group, the T is a phenyl or naphthyl group which is unsubstituted or substituted, which film exhibits comparable high polarizing activity with film using iodine and superior durability.

16 Claims, No Drawings

DYE-CONTAINING POLARIZING FILM

The present invention relates to a dye-containing polarizing film.

Polarizing films are currently prepared generally by incorporating iodine or a dichromatic dye as a polarizing element into an oriented film of polyvinyl alcohol or a derivative thereof, or an oriented film of a polyene which is prepared by dehydrochlorinating a polyvinyl chloride film or dehydrating a polyvinyl alcohol film to produce polyene and applying orientation thereto. The iodine-containing polarizing film has excellent initial polarizing activity but poor tolerance for water and heat. This film has a drawback of lowering polarizing activity while it is stored for a long period at a high temperature under highly humid condition. Several methods for improving the durability have been proposed by a treatment with formalin or an aqueous boric acid solution or employing a polymer film having low moisture permeability as a protecting film, but these methods are not satisfactory. The dichromatic dye-containing polarizing film has more excellent durability to water and heat but poorer polarizing activity than the iodine-containing polarizing film.

The object of the present invention is to provide a dye-containing polarizing film which has excellent polarizing activity and excellent durability to water and heat.

The present invention provides a dye-containing polarizing film comprising a polarizing film material and a metal-containing dye represented by the following formula (I) in the form of the free acid:

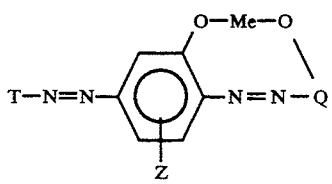

(I)

wherein
Me is a transition metal selected from copper, nickel, zinc and iron;
Z is hydrogen, lower alkyl, lower alkoxy, sulfo or amino which is unsubstituted or substituted:
Q is a 1-naphthol or 2-naphthol residue which is unsubstituted or substituted and has no or an additional phenylazo or naphthylazo group unsubstituted or substituted and in which a hydroxy group is adjacent to the azo group bonding to the benzene ring having Z and is linked with the transition metal denoted by Me to form the complex;
when Q is the naphthol residue free from the additional azo group, then T is naphthyl which is unsubstituted or substituted; and
when Q is the naphthol residue having the additional azo group, then T is a phenyl or naphthyl group which is unsubstituted or substituted.

The metal-containing dye represented by the formula (I) is characterized in that the dye not only absorbs light over a wide range in the wavelength region of visible light from 400 nm to 700 run but also has high polarizing activity and causes no discoloration under a high temperature and high humidity condition.

In the formula (I), Me is a transition metal and includes copper, nickel, zinc and iron. Z is hydrogen, lower alkyl, lower alkoxy, sulfo or amino which may be substituted. The lower alkyl includes $C_1$–$C_4$ alkyl, and the lower alkoxy includes $C_1$–$C_4$ alkoxy. As the substituent of the amino, there are mentioned, for example, $C_1$–$C_4$ alkyl, $C_1$–$C_4$ alkylcarbonyl, $C_1$–$C_4$ alkylsulfonyl, carbamoyl and the like. Z represents preferably hydrogen, methyl, ethyl, methoxy, ethoxy, sulfo, acetylamino, methylsulfonyiamino, ureido, methylamino and amino.

The 1-naphthol or 2-naphthol residue represented by Q may be unsubstituted or substituted by one or more substituents such as sulfo, amino which may be substituted and hydroxy. The hydroxy as the substituent for the naphthol residue is not adjacent to the azo group. The substituent of the amino group is, for example, $C_1$–$C_4$ alkyl, $C_1$–$C_4$ alkylcarbonyl, carbamoyl, sulfamoyl, benzoyl which may be substituted by sulfo, amino or $C_1$–$C_4$ alkoxy, phenyl which may be substituted by sulfo, amino or $C_1$–$C_4$ alkoxy, and the like.

The naphthol residue represented by Q may have a further additional phenylazo or naphthylazo group. The metal-containing dye represented by the formula (I) includes a disazo compound and a trisazo compound. When the metal-containing dye is a disazo compound, Q in the formula (I) has no additional azo group, and T in the formula (I) is naphthyl which may be substituted. When the metal-containing dye is a trisazo compound, Q in the formula (I) has the additional azo group, and T in the formula (I) is a phenyl or naphthyl group which may be substituted.

When T in the formula (I) is naphthyl, the substituent thereof includes, for example, hydroxy, sulfo and the like. The naphthyl represented by T is preferably represented by the following formula:

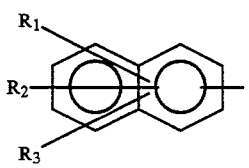

wherein $R_1$, $R_2$ and $R_3$ independently of one another are each hydrogen, hydroxy or sulfo, more preferably naphthyl which is substituted once, twice or three times by sulfo.

When T in the formula (I) is phenyl, the substituent thereof includes, for example, nitro, sulfo, sulfamoyl, $C_1$–$C_4$ alkyl, $C_1$–$C_4$ alkoxy, amino which may be substituted, carboxy, halogeno and the like. The substituent of the amino group includes, for example, $C_1$–$C_4$ alkyl and the like. The phenyl represented by T is preferably represented by the following formula:

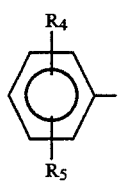

wherein $R_4$ and $R_5$ independently of one another are each hydrogen, nitro, sulfo, sulfamoyl, $C_1$–$C_4$ alkyl, $C_1$–$C_4$ alkoxy, amino which may be substituted, carboxy or halogeno. The phenyl is more preferably a phenyl group which is substituted once or twice by nitro, sulfo, sulfamoyl, methyl, ethyl, methoxy, ethoxy, carboxy or chloro.

A disazo compound within the scope of the formula (I) is preferably represented in the form of the free acid by the following formula (II):

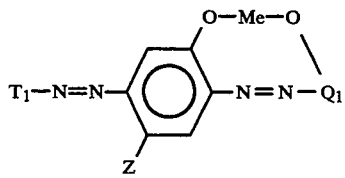
(II)

wherein Me and Z have the same meanings as defined above, $Q_1$ is a 1-naphthol or 2-naphthol residue which is unsubstituted or substituted and has no additional azo group and the hydroxy of the naphthol group is adjacent to the azo group linked to the benzene ring having Z; and $T_1$ is naphthyl which is unsubstituted or substituted.

In the formula (II), the 1-naphthol or 2-naphthol residue represented by $Q_1$ may be unsubstituted, and otherwise may be substituted, but $Q_1$ is preferably a 1-naphthol or 2-naphthol residue having one or more of substituents such as sulfo, amino which may be substituted and hydroxy.

In the formula (II), the naphthyl represented by $T_1$ is preferably represented by the following formula:

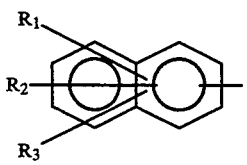

wherein $R_1$, $R_2$ and $R_3$ have the same meanings as defined above.

Z in the formula (II) is preferably hydrogen, methyl, ethyl, methoxy, ethoxy, sulfo, acetylamino, methylsulfonylamino, ureido, methylamino or amino.

When Q in the formula (I) has an additional phenylazo or naphthylazo group, the substituent Q is preferably a 1-naphthol residue represented in the form of the free acid by the following formula:

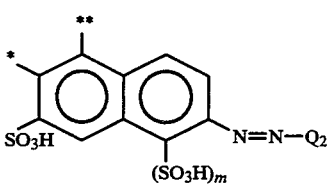

wherein the bond represented by * is linked to the azo group in the formula (I), the bond represented by ** is linked to Me—O— in the formula (I), $Q_2$ is a phenyl or naphthyl group which is unsubstituted or substituted, and m denotes 0 or 1.

A trisazo compound within the scope of the formula (I) is preferably represented in the form of the free acid by the following formula (III):

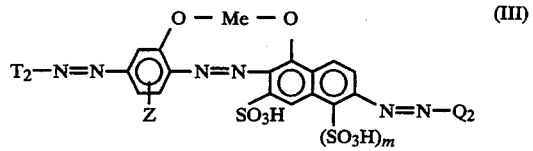
(III)

wherein Me, Z, $Q_2$ and m have the same meanings as defined above, and $T_2$ is a phenyl or naphthyl group which is unsubstituted or substituted.

In the formula (III), the phenyl group represented by $T_2$ is preferably represented by the following formula:

wherein $R_4$ and $R_5$ have the same meanings as defined above, more preferably phenyl which is substituted once or twice by nitro, sulfo, sulfamoyl, methyl, ethyl, methoxy, ethoxy, carboxy or chloro.

In the formula (III), the naphthyl represented by $T_2$ is preferably represented by the following formula:

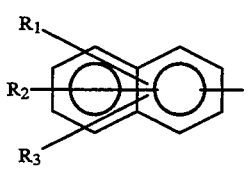

wherein $R_1$, $R_2$ and $R_3$ have the same meanings as defined above, more preferably naphthyl substituted once, twice or three times by sulfo.

When $Q_2$ in the formula (III) is phenyl, the phenyl may be unsubstituted or substituted- The substituent thereof includes, for example, amino which may be substituted, hydroxy, sulfo, $C_1$–$C_4$ alkyl, $C_1$–$C_4$ alkoxy, carboxy, and the like. The substituted amino is, for example, an amino group substituted by methyl, ethyl, hydroxyethyl, cyanoethyl, acetyl, carbnoyl or the like. The alkyl and alkoxy are, for example, methyl, ethyl, methoxy, ethoxy and the like.

In the formula (III), the phenyl represented by $Q_2$ is preferably phenyl substituted by amino which may be substituted or phenyl substituted by hydroxy. One of the preferred phenyl is phenyl substituted once or twice by amino which may be substituted. The amino- or diaminophenyl may be further substituted by hydroxy, sulfo, $C_1$–$C_4$ alkyl, $C_1$–$C_4$ alkoxy or carboxy. Another preferred phenyl is phenyl substituted once, twice or three times by hydroxy. The hydroxy-, dihydroxy- or trihydroxy-phenyl may be further substituted by amino which may be substituted, sulfo, $C_1$–$C_4$ alkyl, $C_1$–$C_4$ alkoxy or carboxy.

When $Q_2$ in the formula (III) is naphthyl, the naphthyl may be unsubstituted or substituted. The substituent thereof includes, for example, hydroxy, amino which may be substituted, sulfo and the like. The substituted amino is, for example, amino substituted by methyl, ethyl, hydroxyethyl, cyanoethyl, acetyl, carbamoyl, phenyl, sulfophenyl, disulfophenyl, benzoyl or the like.

In the formula (III), the naphthyl represented by $Q_2$ is preferably naphthyl substituted by hydroxy or naphthyl substituted by amino which may be substituted. One of the preferred naphthyl is naphthyl which is substituted once or twice by hydroxy. The hydroxy- or dihydroxy-naphthyl may be further substituted by sulfo, unsubstituted amino, or amino substituted by acetyl, phenyl, sulfophenyl, disulfophenyl, benzoyl or methyl. Another preferred naphthyl is naphthyl which is substituted once or twice by unsubstituted amino or amino substituted by methyl, ethyl, hydroxyethyl, cyanoethyl, acetyl or carbamoyl. The amino- or diamino-naphthyl may be further substituted by hydroxy or sulfo.

In the formula (III), Z is preferably hydrogen, methyl, methoxy, ethoxy, acetylamino, methylsulfonylamino, ureido, amino or sulfo.

The metal-containing dye represented by the formula (I) can be prepared by the method described below.

The compound represented by the formula (IV)

$$T-NH_2 \qquad (IV)$$

wherein T has the same meaning as defined above, is diazotized in the usual manner, coupled with the compound represented by the formula (V):

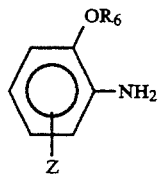

(V)

wherein $R_6$ is hydrogen or lower alkyl, and Z has the same meaning as defined above, or an ω-methanesulfonated derivative thereof, and if necessary, hydrolyzed to give a coupling product. The coupling product thus obtained is diazotized in the usual manner, coupled with the compound represented by the formula (VI):

$$HO-Q-H \qquad (VI)$$

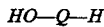

wherein Q has the same meaning as defined above but has no additional azo group, to give a disazo compound. The disazo compound obtained is chelated with copper, nickel, zinc or iron to give a metal-containing dye represented by the formula (I) which has a disazo structure.

In the case of preparing the disazo compound represented by the formula (II), the above-described procedure is repeated with the compound represented by the formula $T_1$-$NH_2$, wherein $T_1$ has the same meaning as defined above, as the compound of the formula (IV) and the compound represented by the formula HO—$Q_1$—H, wherein $Q_1$ has the same meaning as defined above, as the compound of the formula (VI).

The metal-containing dye represented by the formula (I) which has a trisazo structure is prepared by repeating the above-described procedure with the compound of the formula (VI) wherein Q has amino, to give a disazo compound wherein Q has amino, and then diazotized in the usual manner and coupled with unsubstituted or substituted benzene or unsubstituted or substituted naphthalene.

When the trisazo compound represented by the formula (III) is prepared, a disazo compound is first prepared by diazotizing $T_2$—$NH_2$, wherein $T_2$ has the same meaning as defined above, as the compound of the formula (IV), coupling the diazotized compound with the compound represented by the formula (V), diazotizing the coupling product in the usual manner, and coupling the product with the compound in the form of the free acid represented by the formula (VII):

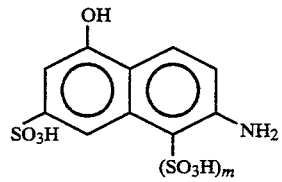

(VII)

wherein m has the same meaning as defined above, under an alkaline condition to give the disazo compound. The disazo compound thus obtained was chelated with copper, nickel, zinc or iron to give a metal-containing disazo compound. The metal-containing disazo compound is diazotized in the usual manner and coupled with the compound represented by the formula (VIII):

$$Q_2-H \qquad (VIII)$$

wherein $Q_2$ has the same meaning as defined above, to give the trisazo compound represented by the formula (III).

The compound represented by the formula (IV) includes, for example, 1-aminobenzene, 1-amino-2-, 3- or 4-nitrobenzene, 1-amino-2-, 3- or 4-benzenesulfonic acid, 5-aminobenzene-1,3-disulfonic acid, 6-aminobenzene-1,4disulfonic acid, 4-aminobenzene-1,2-disulfonic acid, 1-amino-2-, 3- or 4-sulfmoylbenzene, 1-amino-2-, 3- or 4-benzoic acid, 1-amino-2-, 3- or 4-chlorobenzene, 1-amino-2,5-dichlorobenzene, 1-amino-2-, 3- or 4-bromobenzene, 1-amino-2-, 3- or 4-methylbenzene, 1-amino-2-, 3- or 4-ethylbenzene, 1-amino-2-, 3- or 4-methoxybenzene, 1-amino-2-, 3- or 4-ethoxybenzene, 1,4-diaminobenzene-2-sulfonic acid, 4-di(β-hydroxyethyl)-1-aminobenzene, 1-aminonaphthalene-4-, 5-, 6-, 7- or 8-sulfonic acid, 2-aminonaphthalene-1-, 8-, 7-, 6- or 5-sulfonic acid, 1-aminonaphthalene-4,7-, 4,6-, 3,7-, 3,8- or 3,6-disulfonic acid, 2-aminonaphthalene-4,8-, 6,8-, 3,6-, 1,5- or 5,7-disulfonic acid, 1-aminonaphthalene-3,6,8-trisulfonic acid, 2-aminonaphthalene-3,6,8-, 4,6,8-, or 1,5,7-trisulfonic acid, 2- or 3-amino-8-naphthol-6-sulfonic acid, 1-amino-8-naphthol-3,6- or 4,6-disulfonic acid and the like. When a disazo compound among the metal-containing dyes of the formula (I) is prepared, a naphthalene compound among the compounds of the formula (IV) is used.

The compound represented by the formula (V) includes, for example, 1-amino-2-hydroxybenzene, 1-amino-2-methoxybenzene, 1-amino-2-methoxy-5-methylbenzene, 1-amino-2,5-dimethoxybenzene, 1-amino-2-methoxy-5-ethoxybenzene, 1-amino-2-methoxy-5-benzenesulfonic acid, 1-amino-2-methoxy-5-acetylaminobenzene, 1-amino-2-methoxy-5-carbamoylaminobenzene, 1,3-diamino-6-methoxybenzene, 1-amino-2-methoxy-5-methylsulfonylaminobenzene and the like.

The compound represented by the formula (VI) includes, 1-hydroxynaphthalene, 1-hydroxynaphthalene-4-, 5- or 3-sulfonic acid, 1-hydroxynaphthalene-3,8- or 3,6-disulfonic acid, 1-hydroxynaphthalene-3,6,8-trisulfonic acid, 2-hydroxynaphthalene, 2-hydroxynaphthalene-8-, 7- or 6-sulfonic acid, 2-hydroxynaphthalene-6,8- or 3,6-disulfonic acid, 2-amino-, methylamino-, ethylamino-, acetylamino-, propionylamino-, benzoylamino-, carbamoylamino-, sulfamoylamino- or phenylamino-8-hydroxlrnaphthalene-6-sulfonic acid, 3-amino-, methylamino-, ethylamino-, propionylamino-, acetylamino-, benzoylamino-, carbamoylamino-, sulfamoylamino- or phenylamino-8-hydroxynaphthalene-6-sulfonic acid, 2- or 3-[(3'- or 4'-sulfophenyl)amino]-8-hydroxlrnaphthalene-6-sulfonic acid, 2- or 3-[(3'- or 4'-aminophenyl)amino]-8-hydroxynaphthalene-6-sulfonic acid, 2- or 3-[(3'- or 4'-methoxyphenyl)amino]-8-hydroxynaphthalene-6-sulfonic acid, 2- or 3-[(3'- or 4'-sulfobenzoyl)amino]-8-hydroxynaphthalene-6-sulfonic acid, 2- or 3-[(3'- or 4'-aminobenzoyl)amino]-8-hydroxynaphthalene-6-sulfonic acid, 1-amino- or acetylamino-8-hydroxynaphthalene-3,6-disulfonic acid, 1-amino- or acetylamino-8-hydroxynaphthalene-4,6-disulfonic acid, 1-amino-8-hydroxlrnaphthalene-2,4-disulfonic acid, 1,8-dihydroxynaphthalene-3,6-disulfonic acid, 2-amino-8-hydroxynaphthalene-3,6-disulfonic acid, 3-amino-8-hydroxynaphthalene-4,6-disulfonic acid and the like.

The compound of the formula (VI) used for preparing the trisazo compounds among the metal-containing dyes represented by the formula (I) is one having amino or a substituent such as acetylamino which is converted into amino by hydrolysis during the subsequent processes. The compound represented by the formula (VII) is, for example, 3-amino-8-hydroxynaphthalene-6-sulfonic acid and 3-amino-8-hydroxynaphthalene-4,6-disulfonic acid.

The compound of the formula (VIII) used for preparing the trisazo compound of the formula (III) is, for example, aniline derivatives, phenol derivatives, aminophenol derivatives, naphthol derivatives, naphthylaminesulfonic acid derivatives and naphtholsulfonic acid derivatives. Preference are 1-hydroxybenzene, 1-hydroxy2-, 3- or 4-methylbenzene, 1,3-dihydroxybenzene, 1-hydroxy-3-methoxybenzene, 1-hydroxy-3-aminobenzene, 3-di($\beta$-hydroxyethyl)amino-1-hydroxybenzene, 1-di($\beta$-hydroxyethyl)aminobenzene, 1,3-diamino-4-methylbenzene, 1-hydroxy-2-benzoic acid, 1,3-diaminobenzene-6-sulfonic acid, 1-acetylamino-4-methoxy-3-di($\beta$-hydroxyethyl)aminobenzene, 3-diethylamino-1-hydroxybenzene, 1-hydroxynaphthalene, 1-hydroxynaphthalene-4-, 5- or 3-sulfonic acid, 1-hydroxynaphthalene-3,8- or 3,6-disulfonic acid, 1-hydroxynaphthalene-3,6,8-trisulfonic acid, 2-hydroxynaphthalene, 2-hydroxynaphthalene-8-, 7- or 6-sulfonic acid, 2-hydroxynaphthalene-6,8- or 3,6-disulfonic acid, 2-amino-, methylamino-, ethylamino-, acetylamino-, propionylamino-, benzoylamino-, carbamoylamino-, sulfamoylamino- or phenylamino-8-hydroxynaphthalene-6-sulfonic acid, 3-amino-, methylamino-, ethylamino-, propionylamino-, acetylamino-, benzoylamino-, carbamoylamino-, sulfamoylamino- or phenylamino-8-hydroxynaphthalene-6-sulfonic acid, 1-amino- or acetylamino-8-hydroxynaphthalene-3,6-disulfonic acid, 1-amino- or acetylamino-8-hydroxynaphthalene-4,6-disulfonic acid, 1-amino-8-hydroxynaphthalene-2,4-disulfonic acid, 1,8-dihydroxynaphthalene-3,6-disulfonic acid and the like.

The metal-containing dye represented by the formula (I) thus obtained is usually used in the form of a sodium salt. Alternatively, the dye may be in the form of a lithium salt, a potassium salt, an ammonium salt, an ethanolamine salt, an alkylamine salt or the like.

The metal-containing dye represented by the formula (I) may be used in combination of the two or more of them or in combination with other organic dye in order to correct the hue and to improve the polarizing activity. Any organic dye may be used in this connection, so long as the dye has different absorption wavelength region from that of the present metal-containing dye and a high dichroism. Such dye in terms of Color Index (C.I.) is, for example, C.I. Direct Yellow 12,
C.I. Direct Yellow 28,
C.I. Direct Yellow 44,
C.I. Direct Yellow 142,
C.I. Direct Blue 1,
C.I. Direct Blue 15,
C.I. Direct Blue 71,
C.I. Direct Blue 78,
C.I. Direct Blue 98,
C.I. Direct Blue 168,
C.I. Direct Blue 202,
C.I. Direct Red 2,
C.I. Direct Red 31,
C.I. Direct Red 79,
C.I. Direct Red 81,
C.I. Direct Red 240,
C.I. Direct Red 247,
C.I. Direct Orange 6,
C.I. Direct Orange 26,
C.I. Direct Orange 39,
C.I. Direct Orange 107,
C.I. Direct Violet 9,
C.I. Direct Violet 51,
C.I. Direct Brown 106,
C.I. Direct Brown 223, and
C.I. Direct Green 85.

The polarizing film of the present invention is prepared by incorporating the metal-containing dye represented by the formula (I), the dichromatic dye, into a polymer film in a well-known method.

The polymer film is, for example, film made from polyvinyl alcohol or derivatives thereof unmodified or modified with an olefin such as ethylene or propylene, chronic acid, acrylic acid, methacrylic acid, maleic acid or the like; EVA (ethylene-vinyl acetate resin), a saponified EVA resin, a nylon resin and a polyester. Preference is a film of polyvinyl alcohol or derivatives thereof in respect to dye absorbency and orientation property.

Incorporation of a dichromatic dye into the polymer film is usually carried out by a method for dyeing a polymer film. For instance, the metal-containing dye represented by the formula (I) with or without the other organic dye is dissolved in water to prepare a dye bath. The dye concentration in the dye bath is not critical but usually in the range from 0.01 to 10% by weight. If necessary, a dyeing assistant such as sodium sulfate may be used preferably in an amount from 2 to 10% by weight. Dyeing is carried out by dipping a polymer film into a dye bath thus prepared. Dyeing temperature is preferably in the range from 50 to 70° C.

Orientation of the dichromatic dye is conducted by stretching the film. Stretching may be conducted with any of well-known methods such as a wet stretching method or a dry compression stretching method. The polymer film may be stretched prior to the dyeing.

If necessary, the polymer film is subjected to a post-treatment such as a boric acid treatment by the well-known method in order to improve transmittance of light and polarizing activity of a polarizing film. The conditions of the treatment with boric acid vary depending on the polymer films and the dichromatic dyes. The treatment is usually carried out in an aqueous boric acid solution having a concentration from 1 to 15% by weight, preferably from 5 to 10% by weight, at a temperature from 30 to 80° C., preferably from 50 to 75° C. The polymer film may further be subjected, if necessary, to a fixing treatment in an aqueous solution containing a cationic polymer compound.

The dye-containing polarizing film thus obtained may be laminated on one side or both sides with a protective film excellent in optical transparency and mechanical strength to form a polarizing plate. The protective film is oriented one by monoaxial stretching of, for example, a fluorine type film such as a tetrafluoroethylene/hexafluoropropylene copolymer film or a polyester resin film, a polyolefin resin film or a polyamide resin film as well as a cellulose acetate film and an acrylic film which have been conventionally used.

Thus, a polarizing film which has a high polarizing activity and is excellent in durability against water and heat is obtained. In addition, a polarizing film having excellent properties and a neutral color is obtained by combination of the metal-containing dye represented by the formula (I) and the other organic dyes.

The dye-containing polarizing film of the present invention exhibits polarizing activity not smaller than an iodine-containing film and has excellent durability. The present polarizing film is applied to a variety of liquid crystal displays, particularly to displays for automobiles which require excellent polarizing activity and durability and for industrial instruments used in various circumstances.

The present invention is now explained in more details with reference to examples, which are only illustrative, and the present invention is not limited thereto. In examples, % means % by weight.

EXAMPLE 1

Polyvinyl alcohol film having a thickness of 75 μm (KURARAYVINYLON No. 7500; manufactured from Kuraray Co. Ltd.) was stretched monoaxially to the longitudinal direction to a length of four times of its original length to form a polarizing film material. The polyvinyl alcohol film, while being maintained under tension, was dipped into an aqueous solution containing 0,025% of the disazo compound represented by the following formula:

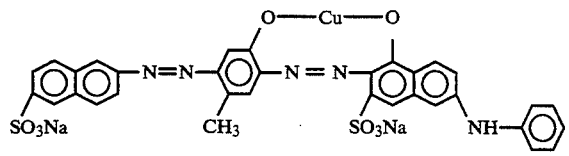

and 2.0% of sodium sulfate as a dyeing assistant at 60° C. for 10 minutes. The film was further dipped into an aqueous solution containing 7.5% of boric acid at 65° C. for 5 minutes, and washed with water at 20° C. for 20 seconds to give a polarizing film.

The film obtained had a maximum absorption wavelength $\lambda_{max}$ at 610 nm and exhibited high polarizing activity and durability over a long period under the condition of high temperature and high humidity.

EXAMPLE 2

A polarizing film was obtained by repeating the procedure in Example 1 except that the disazo compound represented by the following formula

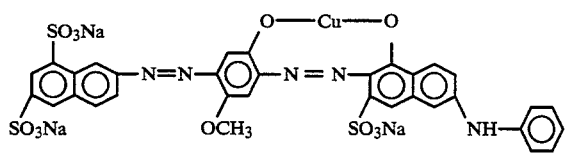

was used in place of the disazo compound used in Example 1.

The polarizing film obtained had a maximum absorption wavelength $\lambda_{max}$ at 650 nm and a wide absorption region and exhibited high polarizing activity.

EXAMPLE 3

The polarizing films were obtained by repeating the procedure in Example 1 except that the dyes represented by the formulae in the second column of the following table in place of the disazo compound used in Example 1. In the table, $\lambda_{max}$ means a value of the polarizing film, and the structural formulae are shown in the form of the free acid.

| No. | Structural formula | $\lambda_{max}$ (nm) |
| --- | --- | --- |
| 1 | ![structure 1] | 640 |
| 2 | ![structure 2] | 640 |

-continued

| No. | Structural formula | λmax (nm) |
|---|---|---|
| 3 | | 640 |
| 4 | | 640 |
| 5 | | 650 |
| 6 | | 650 |
| 7 | | 640 |
| 8 | | 610 |
| 9 | | 640 |

-continued

| No. | Structural formula | λmax (nm) |
|---|---|---|
| 10 | (structure with Cu complex, naphthalene-SO₃H, N=N, NHCONH₂, SO₃H, NHCO-phenyl) | 630 |
| 11 | (structure with Cu complex, naphthalene-SO₃H, N=N, CH₃, SO₃H, NHCH₃) | 610 |
| 12 | (structure with Cu complex, naphthalene-(SO₃H)₂, N=N, NHCH₃, SO₃H, NH-phenyl) | 650 |
| 13 | (structure with Cu complex, naphthalene-(SO₃H)₂, N=N, NHSO₂CH₃, SO₃H, NH-phenyl) | 630 |
| 14 | (structure with Cu complex, naphthalene-(SO₃H)₂, N=N, SO₃H, NH₂) | 620 |
| 15 | (structure with Fe complex, naphthalene-(SO₃H)₂, N=N, OCH₃, SO₃H, NH-phenyl) | 650 |
| 16 | (structure with Ni complex, naphthalene-(SO₃H)₂, N=N, OCH₃, SO₃H, NH-phenyl) | 650 |
| 17 | (structure with Cu complex, naphthalene-(SO₃H)₃, N=N, OCH₃, SO₃H, NH-phenyl) | 650 |

| No. | Structural formula | λmax (nm) |
|---|---|---|
| 18 | (structure) | 650 |
| 19 | (structure) | 650 |
| 20 | (structure) | 640 |
| 21 | (structure) | 620 |
| 22 | (structure) | 650 |
| 23 | (structure) | 600 |
| 24 | (structure) | 650 |

EXAMPLE 4

Polyvinyl alcohol film having a thickness of 75 μm (KURARAYVINYLON No. 7500: manufactured from Kuraray Co. Ltd.) was stretched monoaxially to the longitudinal direction to a length of four times of its original length to form a polarizing film material. The polyvinyl alcohol film, while being maintained under tension, was dipped into an aqueous solution containing 0.025% of the trisazo compound represented by the following formula:

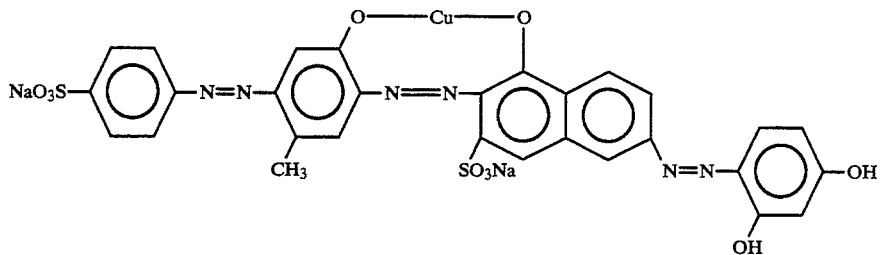

and 2.0% of sodium sulfate as a dyeing assistant at 60° C. for 20 minutes. The film was further dipped into an aqueous solution containing 7.5% of boric acid at 65° C. for 5 minutes, washed with water at 20° C. for 20 seconds and dried to give a polarizing film.

The film obtained had a maximum absorption wavelength $\lambda_{max}$ at 620 nm and exhibited high polarizing activity and durability over a long period under the condition of high temperature and high humidity.

EXAMPLE 5

A polarizing film was obtained by repeating the procedure in Example 4 except that 0.013% of the trisazo compound represented by the following formula and 0.012% of the trisazo compound represented by the following formula:

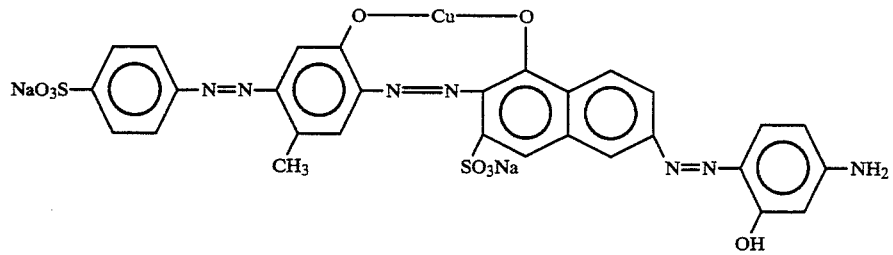

were used in place of the trisazo compound used in Example 4.

The polarizing film obtained had a maximum absorption wavelength max at 620 nm and a wide absorption region and exhibited high polarizing activity.

EXAMPLE 6

Polarizing films were obtained by repeating the procedure in Example 4 except that the dyes represented by the formulae in the second column of the following table in place of the trisazo compound used in Example 4. In the table, $\lambda_{max}$ means a value of the polarizing film.

| No. | Structural formula | $\lambda$max (nm) |
|---|---|---|
| 1 | 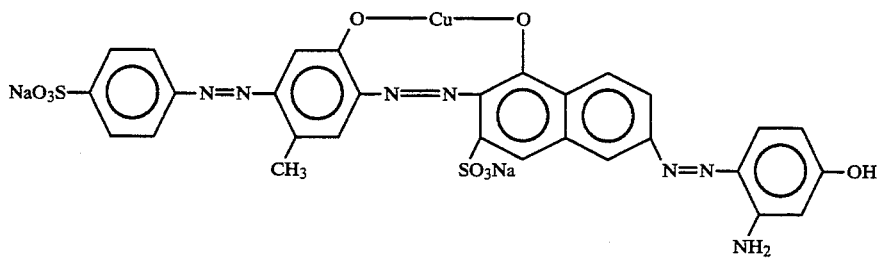 | 610 |

-continued

| No. | Structural formula | λmax (nm) |
|---|---|---|
| 2 | | 620 |
| 3 | | 620 |
| 4 | | 610 |
| 5 | | 620 |
| 6 | | 630 |
| 7 | | 620 |

-continued

| No. | Structural formula | λmax (nm) |
|---|---|---|
| 8 | | 620 |
| 9 | | 620 |
| 10 | | 620 |
| 11 | | 630 |
| 12 | | 620 |
| 13 | | 610 |

-continued

| No. | Structural formula | λmax (nm) |
|---|---|---|
| 14 | | 620 |
| 15 | | 620 |
| 16 | | 620 |
| 17 | | 620 |
| 18 | | 620 |
| 19 | | 610 |
| 20 | | 620 |

-continued

| No. | Structural formula | λmax (nm) |
|---|---|---|
| 21 | (structure) | 620 |
| 22 | (structure) | 620 |
| 23 | (structure) | 620 |
| 24 | (structure) | 630 |
| 25 | (structure) | 620 |
| 26 | (structure) | 620 |

| No. | Structural formula | λmax (nm) |
|---|---|---|
| 27 | 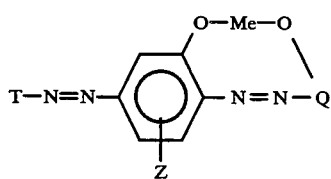 | 620 |
| 28 |  | 610 |
| 29 |  | 620 |

What is claimed is:

1. A dye-containing polarizing film comprising a polarizing film material and a metal-containing dye therein, wherein said metal-containing dye is represented by the following formula (I) in the form of a free acid:

$$\text{T—N=N—}\underset{Z}{\underset{|}{\bigcirc}}\overset{\text{O—Me—O}}{\phantom{X}}\diagdown\text{N=N—Q} \quad (I)$$

wherein

Me is a transition metal selected from the group consisting of copper, nickel, zinc and iron;

Z is selected from the group consisting of hydrogen, lower alkyl, lower alkoxy, sulfo, unsubstituted amino and amino substituted with $C_1$-$C_4$ alkyl, $C_1$-$C_4$ alkylcarbonyl, $C_1$-$C_4$ alkylsulfonyl or carbamoyl; and Q is a 1-naphthol or 2-naphthol residue in which a hydroxy group is adjacent to the azo group bonding to the benzene ring having Z and is linked with the transition metal denoted by Me to form the complex, said 1-naphthol or 2-naphthol residue is unsubstituted or has at least one substituent selected from the group consisting of sulfo, hydroxy, unsubstituted amino and amino substituted with $C_1$-$C_4$ alkyl, $C_1$-$C_4$ alkylcarbonyl, carbamoyl, sulfamoyl, benzoyl which may be substituted by sulfo, amino or $C_1$-$C_4$ alkoxy, or phenyl which may be substituted by sulfo, amino of $C_1$-$C_4$ alkoxy, said 1-naphthol or 2-naphthol residue has no or a sole additional phenylazo or naphthylazo group, said additional phenylazo group is unsubstituted or has at least one substituent selected from the group consisting of hydroxy, sulfo, $C_1$-$C_4$ alkyl, $C_1$-$C_4$ alkoxy, carboxy, unsubstituted amino and amino substituted by methyl, ethyl, hydroxyethyl, cyanoethyl, acetyl or carbamoyl, and said additional naphthylazo group is unsubstituted or has at least one substituent selected from the group consisting of hydroxy, sulfo, unsubstituted amino and amino substituted with methyl, ethyl, hydroxyethyl, cyanoethyl, acetyl, carbamoyl, phenyl, sulfophenyl, disulfophenyl or benzoyl, provided that when Q is said 1-napthol or 2-naphthol residue having no said additional phenylazo or naphthylazo group, then T is naphthyl which is unsubstituted or has at least one substituent selected from the group consisting of hydroxy and sulfo and that when Q is said 1-naphthol or 2-naphthol residue having said additional phenylazo or naphthylazo group, then T is phenyl which is unsubstituted or has at least one substituent selected from the group consisting of nitro, sulfo, sulfamoyl, $C_1$-$C_4$ alkyl, $C_1$-$C_4$ alkoxy, carboxy, halogeno, unsubstituted amino and amino substituted by $C_1$-$C_4$ alkyl or hydroxyethyl, or T is naphthyl which is unsubstituted or has at least one substituent selected from the group consisting of hydroxy and sulfo.

2. The dye-containing polarizing film according to claim 1, wherein Z is selected from the group consisting of hydrogen, methyl, ethyl, methoxy, ethoxy, sulfo, acetylamino, methylsulfonylamino, ureido, methylamino and amino.

3. The dye-containing polarizing film according to claim 1, wherein said metal-containing dye is a disazo compound represented by the following formula (II) in the form of a free acid:

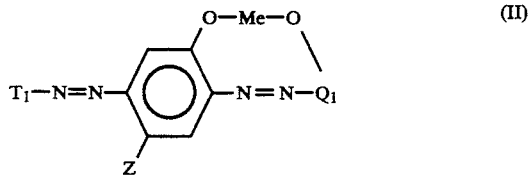

(II)

wherein

Me and Z are as defined in claim 1;

$Q_1$ is a 1-naphthol or 2-naphthol residue which has no additional azo group and is unsubstituted or has at least one substituent selected from the group consisting of sulfo, hydroxy, unsubstituted amino and amino substituted with $C_1$-$C_4$ alkyl, $C_1$-$C_4$ alkylcarbonyl, carbamoyl, sulfamoyl, benzoyl which may be substituted with sulfo, amino or $C_1$-$C_4$ alkoxy, or phenyl which may be substituted with sulfo, amino or $C_1$-$C_4$ alkoxy, and, in said 1-naphthol or 2-naphthol residue, a hydroxy group is adjacent to the azo group bonding to the benzene ring having Z; and $T_1$ is naphthyl which is unsubstituted or has at least one substituent selected from the group consisting of hydroxy and sulfo.

4. The dye-containing polarizing film according to claim 3, wherein $T_1$ is naphthyl represented by the following formula:

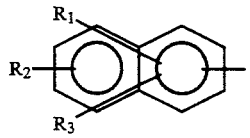

wherein $R_1$, $R_2$ and $R_3$, independently of one another, are each hydrogen, hydroxy or sulfo.

5. The dye-containing polarizing film according to claim 3, wherein $Q_1$ is a 1-naphthol or 2-naphthol residue having at least one substituent selected from the group consisting of sulfo, hydroxy, unsubstituted amino and amino substituted by $C_1$-$C_4$ alkyl, $C_1$-$C_4$ alkylcarbonyl, carbamoyl, sulfamoyl, benzoyl which may be substituted by sulfo, amino or $C_1$-$C_4$ alkoxy, or phenyl which may be substituted by sulfo, amino or $C_1$-$C_4$ alkoxy.

6. The dye-containing polarizing film according to claim 1, wherein said metal-containing dye is a trisazo compound represented by the following formula (III) in the form of a free acid:

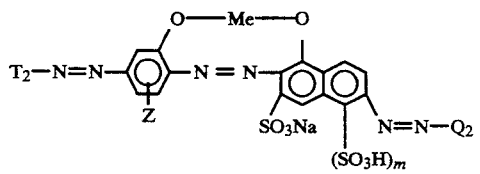

(III)

wherein

Me and Z are as defined in claim 1;

$Q_2$ is phenyl or naphthyl, wherein said phenyl is unsubstituted or has at least one substituent selected from the group consisting of hydroxy, sulfo, $C_1$-$C_4$ alkyl, $C_1$-$C_4$ alkoxy, carboxy, unsubstituted amino and amino substituted by methyl, ethyl, hydroxyethyl, cyanoethyl, acetyl or carbamoyl, and said naphthyl is unsubstituted or has at least one substituent selected from the group consisting of hydroxy, sulfo, unsubstituted amino and amino substituted by methyl, ethyl, hydroxyethyl, cyanoethyl, acetyl, carbamoyl, phenyl, sulfophenyl, disulfophenyl or benzoyl;

$T_2$ is phenyl or naphthyl, wherein said phenyl of $T_2$ is unsubstituted or has at least one substituent selected from the group consisting of nitro, sulfo, sulfamoyl, $C_1$-$C_4$ alkyl, $C_1$-$C_4$ alkoxy, carboxy, halogeno, unsubstituted amino and amino substituted by $C_1$-$C_4$ alkyl or hydroxyethyl, and said naphthyl of $T_2$ is unsubstituted or has at least one substituent selected from the group consisting of hydroxy and sulfo; and m is 0 or 1.

7. The dye-containing polarizing film according to claim 6, wherein $T_2$ is phenyl represented by the following formula:

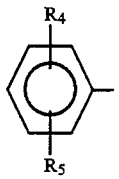

wherein $R_4$ and $R_5$, independently of one another, are each hydrogen, nitro, sulfo, sulfamoyl, $C_1$-$C_4$ alkyl, $C_1$-$C_4$ alkoxy, carboxy, halogeno, unsubstituted amino or amino substituted by $C_1$-$C_4$ alkyl or hydroxyethyl.

8. The dye-containing polarizing film according to claim 6, wherein $T_2$ is naphthyl represented by the following formula:

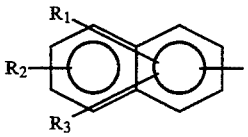

wherein $R_1$, $R_2$ and $R_3$, independently of one another, are each hydrogen, hydroxy or sulfo.

9. The dye-containing polarizing film according to claim 6, wherein $Q_2$ is phenyl which is substituted once, twice or three times by hydroxy and additionally unsubstituted or substituted by sulfo, $C_1$-$C_4$ alkyl, $C_1$-$C_4$ alkoxy, carboxy or amino which is unsubstituted or substituted by methyl, ethyl, hydroxyethyl, cyanoethyl, acetyl, carbamoyl, phenyl, sulfophenyl, disulfophenyl or benzoyl.

10. The dye-containing polarizing film according to claim 6, wherein $Q_2$ is phenyl which is substituted once or twice by amino which is unsubstituted or substituted by methyl, ethyl, hydroxyethyl, cyanotheyl, acetyl, carbamoyl, phenyl, sulfophenyl, disulfophenyl or benzoyl, said phenyl as $Q_2$ being additionally unsubstituted or substituted by hydroxy, sulfo, $C_1$-$C_4$ alkyl, $C_1$-$C_4$ alkoxy or carboxy.

11. The dye-containing polarizing film according to claim 6, wherein $Q_2$ is naphthyl which is substituted once or twice by hydroxy and additionally unsubstituted or substituted by sulfo, unsubstituted amino or amino substituted by methyl, ethyl, hydroxyethyl, cyanoethyl, acetyl, carbamoyl, phenyl, sulfophenyl, disulfophenyl or benzoyl.

12. The dye-containing polarizing film according to claim 6, wherein $Q_2$ is naphthyl which is substituted once or twice by amino which is unsubstituted or substituted by methyl, ethyl, hydroxyethyl, cyanoethyl, acetyl, carbamoyl, phenyl, sulfophenyl, disulfophenyl or benzoyl, and said naphthyl as $Q_2$ is additionally unsubstituted or substituted by hydroxy or sulfo.

13. The dye-containing polarizing film according to claim 1, wherein Me is Cu.

14. The polarizing film according to claim 1, wherein at least two dye compounds each represented by the formula (I) is present.

15. The polarizing film according to claim 1, which further comprises an organic dye other than the metal-containing dye represented by the formula (I).

16. The polarizing film according to claim 1, wherein the polarizing film material comprises polyvinyl alcohol or its derivative.

* * * * *